(12) United States Patent
Busch

(10) Patent No.: US 7,717,160 B2
(45) Date of Patent: May 18, 2010

(54) DRIVE HEAT-EXCHANGER UNIT

(75) Inventor: Jörg Busch, Königsbronn-Zang (DE)

(73) Assignee: Voith Turbo GmbH & Co. KG (DE)

( * ) Notice: Subject to any disclaimer, the term of this patent is extended or adjusted under 35 U.S.C. 154(b) by 1061 days.

(21) Appl. No.: 10/550,903

(22) PCT Filed: Mar. 30, 2004

(86) PCT No.: PCT/EP2004/003354

§ 371 (c)(1),
(2), (4) Date: Dec. 7, 2005

(87) PCT Pub. No.: WO2004/088175

PCT Pub. Date: Oct. 14, 2004

(65) Prior Publication Data

US 2006/0191666 A1    Aug. 31, 2006

(30) Foreign Application Priority Data

Mar. 31, 2003   (DE) ................... 103 14 733

(51) Int. Cl.
*F24H 3/00*    (2006.01)
*F01N 5/02*    (2006.01)
*B60H 1/00*    (2006.01)
(52) U.S. Cl. .............. 165/47; 165/41; 165/51
(58) Field of Classification Search ........... 165/41, 165/42, 47, 51, 52
See application file for complete search history.

(56) References Cited

FOREIGN PATENT DOCUMENTS

| | | |
|---|---|---|
| DE | 93 02 767.2 | 7/1993 |
| DE | 19625357 | 1/1998 |
| DE | 198 27 604 A1 | 12/1999 |
| DE | 100 42 472 A1 | 11/2001 |
| DE | 100 58 110 A1 | 6/2002 |
| EP | 0 785 379 A2 | 7/1997 |
| EP | 0 812 746 A2 | 12/1997 |
| GB | 2 387 206 A | 10/2003 |
| JP | 2000356261 | 12/2000 |

OTHER PUBLICATIONS

International Preliminary Report On Patentability, mailing date Mar. 2, 2006; and attached PCT Notification of Transmittal of Translation of the International Preliminary Report on Patentability (Chapter I or Chapter II of the Patent Corporation Treaty). Total pages 8.

*Primary Examiner*—Ljiljana (Lil) V Ciric
(74) *Attorney, Agent, or Firm*—Ostrolenk Faber LLP

(57) ABSTRACT

A transmission/heat exchanger unit includes a transmission having an input and at least one output and a heat exchanger, which is assigned to the output side of the transmission and is connected to said transmission at least indirectly via connecting lines. A duct or ducts route fuel, and is/are integrated in the case of the transmission, and extend(s) at least over part of the axial extent of the case to an end face of the transmission on the output side. A retaining device is provided for fastening the heat exchanger to the end face of the case of the transmission on the output side. The connecting lines that couple the fuel-routing duct or ducts in the transmission with the heat exchanger are integrated in the retaining device. Complementary connections of a standard type and size, which are located on the retaining device and the transmission case, are provided for fuel routing and for fastening the retaining device.

13 Claims, 1 Drawing Sheet

DRIVE HEAT-EXCHANGER UNIT

CROSS REFERENCE TO RELATED APPLICATION

The present application is a 35 U.S.C. §§371 national phase conversion of PCT/EP2004/003354 filed 30 Mar. 2004, which claims priority of German Application No. 103 14 733.0 filed 31 Mar. 2003. The PCT International Application was published in the German language.

The invention relates to a transmission/heat exchanger unit.

When transmissions, in particular automatic transmissions, are used in drive trains, it is known to assign to these transmissions a heat exchanger which is arranged on the output side. In this case, the connection of the heat exchanger to the transmission takes place via hose lines and/or pipe lines. These must be adapted in terms of their layout to the requirements of the corresponding transmission and, furthermore, must be connected accordingly to the transmission and to the heat exchanger respectively. In the event of an improper connection or particular loads, leakage losses may occur, which result in a loss of fuel and an environmental hazard. This means that the time intervals for filling up with new fuel, that is with a medium which is necessary for operating the transmission, for example in the form of lubricant and/or control medium, are relatively short. A further substantial disadvantage of such a coupling between the heat exchanger and transmission is that the line routing must also be taken into account in the design of the transmission in respect of the construction space required.

To solve these problems, DE 196 25 357 A1 discloses a version with ducts for fuel and/or coolant which are integrated in the case wall of the transmission and which extend onto the end face of the transmission. The heat exchanger is arranged on this end face. A substantial disadvantage of the direct arrangement, in particular by flanging, of the heat exchanger at the end of the transmission is, on the one hand, that the corresponding connections for fastening the heat exchanger and coupling the ducts must always be adapted to the actual heat exchanger solution. Furthermore, these must be designed correspondingly or additional measures must be taken in order always to ensure a leak tight connection of the heat exchanger.

Assignments of heat exchangers to structural transmission units, furthermore, are already known from the following publications:
1. EP 0 812 746 A2
2. DE 196 25 357

A drive subassembly with a retarder and with a heat exchanger is already known from the publication EP 0 812 746 A2. In this case, the retarder, the heat exchanger, an adaptor and, if appropriate, a transmission are directly assembled together mechanically and are connected conductively to one another by means of the ducts of the adaptor. The retarder is flanged on the transmission. The adaptor performs a plurality of functions simultaneously: on the one hand, it connects said components mechanically and, furthermore, it makes conducting connections between these by means of its ducts. This solution allows a rapid and direct connection of the heat exchanger to the retarder, with hoses being avoided completely. In this case, as a rule, the adaptor is arranged in the rear region of the transmission and serves for coupling between the retarder and the heat exchanger. Via the heat exchanger, it is possible, furthermore, also to cool the media of other components. This, however, necessitates the correspondingly complicated line routing which, particularly with the retarder being interposed, either already has to be taken into account as a preliminary or else is led around the latter.

A version of the heat exchanger integrated in a transmission is already known from DE 196 25 357 A1. The heat exchanger is arranged as an integral part of the transmission case. Preferably, in this instance, the heat exchanger is integrated directly into the transmission case. This takes place in that ducts for the oil/water or air routing are cast or worked directly into the transmission case. The same applies to the supply of the medium to be cooled to the heat exchanger and the connection pieces for the cooling medium. If the ducts are worked into the case, in particular the case wall, they may be provided in such a way that they are closed from the outside via a cover plate. It is conceivable, furthermore, for the heat exchanger to be designed as a flat disk-shaped unit which is mounted virtually positively onto a transmission side which is prepared correspondingly in the case configuration. Especially in applications with retarders, this solution affords the advantage that, in this, there is no need to have to route the cooling water lines from the engine past the transmission to the rear, since the connection can already be provided at the front end of the transmission. A substantial disadvantage of this version, however, is that, particularly in the case of integrated ducts, there is no separate heat exchanger provided, but, instead, the exchange possibilities taking place via the intermediate walls between the ducts assume the function of the heat exchanger. In the version illustrated, the supply of coolant takes place at any desired point on the transmission. With integration in the case wall, however, it is necessary, to ensure an optimum cooling action, to provide correspondingly long line paths which, in turn, are reflected in the corresponding preparation of the case or else in the size of the heat exchanger. Moreover, the integration provided in the case leads to a very special design. The construction space required for this purpose is always used up. As regards use in buses, however, the necessary free spaces for the construction spaces required for this purpose are not always available in all directions.

SUMMARY OF THE INVENTION

The object on which the invention is based was, therefore, to provide a transmission/heat exchanger unit for use in drive trains, in such a way that said disadvantages are avoided and, in particular, unnecessary leakage losses are ruled out and a simple and reliable fuel routing via the heat exchanger is ensured. Furthermore, the solution according to the invention is to be distinguished by a low outlay in structural and manufacturing terms. The number of components required needs to be minimized considerably and leak tightness and a low-stress coupling of the most diverse possible heat exchangers to the transmission are to be ensured.

According to the invention, in the transmission/heat exchanger unit, the heat exchanger is arranged on the transmission, preferably directly on the output side. The tie-up of the heat exchanger in this case takes place via a retaining device. The retaining device is fastened to the transmission, in particular the output-side end face of the case of the transmission. According to the invention, the connecting lines between the transmission and the heat exchanger, which function as a supply and discharge line coming from the heat exchanger, are integrated at least partially into the wall of the retaining device, that is integrally formed on the wall to form part of the wall. Preferably, they may also be arranged completely in the wall of the retaining device, that is to say be surrounded completely by the retaining device. As a result, the connecting lines functioning as a supply and discharge line to and from the heat exchanger become integral parts of the retaining device. The line paths between the output from the transmission and the input to the heat exchanger can thereby be kept very short. Furthermore, the space used in the housing for the retaining device is utilized in an optimum way, so that no additional construction space has to be taken into account in the design of the transmission/heat exchanger unit. The connections on the heat exchanger are not subjected to bending stress, as in the case of solutions directly flanged on.

By means of "intelligent" holders, variability for a multiplicity of applications can in this case be achieved, in particular because the changes of heat exchangers, in comparison with holders, are very complicated and consequently entail high costs.

The mutually complementary connections on the transmission case and the retaining device for the fuel to be routed and/or the fastening are preferably of standardized design. This makes it possible to provide a carrier element suitable with regard to this coupling for a multiplicity of the most diverse possible heat exchangers. The carrying element, in turn, preferably has likewise standardized connections for the heat exchanger.

The retaining device in this case assumes mainly the carrying and supporting function for the heat exchanger and, furthermore, an adaptor function for the connection of different heat exchangers. Preferably, for this purpose, the mutually complementarily designed connections for fastening the heat exchanger are arranged on the output-side end face of the case. This arrangement preferably is in a case wall region reinforced in a plane oriented transversely to the axis of rotation. This reinforcement in this instance extends over the entire axial extent of the transmission case or else at least over that part in which the fuel-routing ducts are arranged.

Furthermore, this arrangement or tie-up of the heat exchanger via the retaining device ensures that any desired heat exchangers can be coupled to the transmission, without their configuration also having to be designed in light of the bend-stressed mechanical and media-routing connection to the case. This, then, can be shifted to the retaining device which may be designed as standard for specific sizes, depending on the transmission design, in particular the case design. Standardized or conventional heat exchangers may therefore be employed. The individual connections to the heat exchanger from the retaining device either then are designed to fit correspondingly, that is to say to overlap directly with the heat exchanger, or, when the heat exchanger is exchanged, may, if necessary, be implemented via short lines in the region of the retaining device. Preferably, however, standardized connections in terms of type, dimensioning and arrangement on the individual elements are also selected between the connecting lines in the retaining device and the connections on the heat exchanger.

The connection for the coolant on the heat exchanger is provided directly on the retaining device. The media required for operating the transmission are preferably routed in the transmission likewise in ducts integrated in the case. This routing allows the direct transition to the retaining device of the heat exchanger. In this instance, the connections provided for this purpose on the case and of the retaining device are to be arranged in a correspondingly complementary manner, in order to ensure a reliable overlap. The retaining device is in this instance preferably braced in the axial direction with respect to the case via a seal and/or is sealed off and axially braced via insertion tubes in each case by means of at least two radially sealing O-rings or the like.

The tie-up of the connections for the coolant to the retaining device affords the advantage that, in the event of a change of the connections, the fastening of the heat exchanger to the holder does not have to be opened or modified.

The fuel-routing ducts in the case wall in this instance extend over at least part of the axial extent of the case through the case wall in the direction of the output side with regard to the transmission of power from the input of the transmission to the output.

The heat exchanger may be designed as a separate component or else be combined with the transmission cover to form a functional unit, in that the retaining device is fastened, for example, via the transmission cover to the case. In this instance, however, the transmission cover is also equipped with the corresponding ducts for the routing of operating medium.

BRIEF DESCRIPTION OF THE DRAWING

The solution according to the invention is explained below by means of FIG. 1 which is a diagrammatic simplified illustration in perspective view of the basic setup of a transmission/heat exchanger unit configured according to the invention.

DESCRIPTION OF A PREFERRED EMBODIMENT

Figure 1:
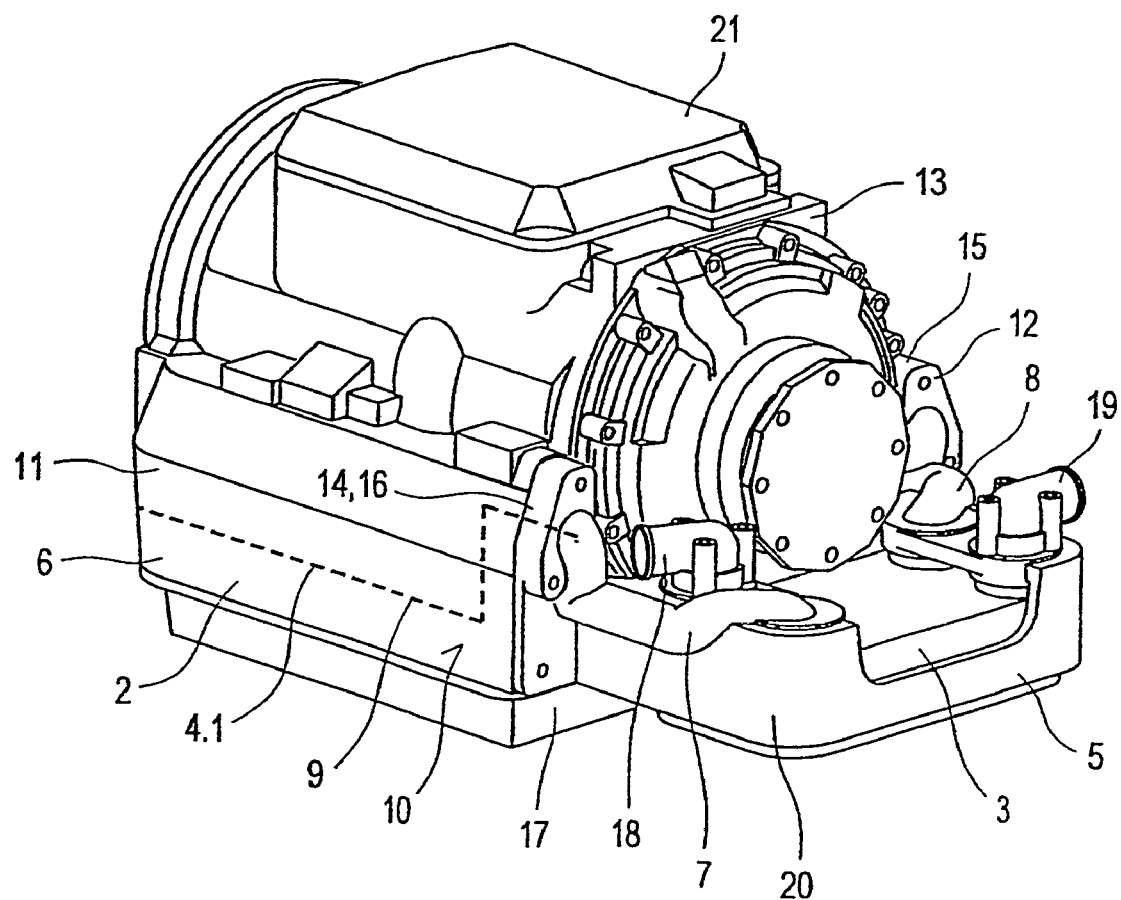

A heat exchanger unit 1 comprises a transmission 2 with an input E couplable to an engine and with at least one output A. A heat exchanger 3 is assigned to the transmission 2 on the output side, that is to-say at the output A, and it can be coupled at least indirectly to the fuel-routing lines and/or ducts 4 of the transmission. The heat exchanger 3 is in this instance mounted on the transmission 2, in particular on its case 6, via a retaining device 5. According to the invention, the connecting lines 7 and 8 between the heat exchanger 3 and the transmission 2 are integrated in the retaining device 5. In this instance, at least in each case two connecting lines, in the instance illustrated the connecting line 7 and the connecting line 8, are provided. Depending on the functional assignment, one of the two connecting lines functions as an inflow line to the heat exchanger 3, while the other functions as the outflow line. In the instance illustrated, for example, the connecting line 7 functions as an inflow line and the connecting line 8 as an outflow line. The two connecting lines are connected to corresponding lines or ducts 4 in the transmission 2. These are preferably lines or ducts which are integrated in the wall 9 of the case 6 and they serve for the routing of media required for operating the structural transmission unit. These are, as a rule, the transmission oil which is used for the purpose of lubrication or else for the purpose of the activation of shift elements. The oil is also used for the purpose of cooling and for hydrodynamics, that is to say the transmission of power in the converter. It is conceivable, furthermore, for the oil to supply hydrodynamic components. Here, too, at least two lines 4.1 and 4.2 are provided, one being couplable to the connecting line 7 arranged in the retaining device 5 and functioning as an inflow line, while the other can be connected to the connecting line 8 arranged in the retaining device 5, so as to form a circuit 10. Coupling takes place via corresponding connections 11 and 12 on the case 6. Two fuel-routing lines or ducts 4.1 and 4.2 or connecting lines 7 and 8 are illustrated, but it is also conceivable to use a plurality of such ducts and lines which, however, must be equipped appropriately complementarily to one another or with corresponding connections on the case 6 of the transmission 2 and the retaining device 5. In this instance, the connections 11 and 12 on the output-side end face 13 of the transmission 2 can then be connected to connections 14 and 15 on the end face 16 facing the transmission 2. This type of connection may be implemented in many different ways. It is critical merely that the connections 11 and 12 and also 14 and 15 are designed complementarily to one another, so that, in actual fact, a circuit 10 which may be designed as an open or closed circuit is produced. The coupling implemented between the individual connections 11 and 14 or 12 and 15 may be designed in many different ways. This may take place positively and/or nonpositively. Preferably, however, the retaining device 5 is braced in the axial direction with respect to the case 6, using interposed seals 17. Insertion tubes with corresponding seals are often also used alone or even in conjunction with the flat seals described. The retaining device is mounted on the case via the fastening on the case, which fastening may take place nonpositively and/or positively.

Furthermore, the heat exchanger 3 is assigned a cooling circuit, not illustrated in detail here, which serves for the routing of cooling medium. What can be seen in this regard are the connections 18 and 19 for the coolant-routing ducts or lines which function as an inflow and an outflow line and which may be an integral part of an open or closed circuit. By means of this solution according to the invention, complicated hose lines or pipe lines for connecting the heat exchanger 3 to the transmission 2 are dispensed with. The connecting lines 7 and 8 integrated into the retaining device 5 are in this instance preferably integrated at least partially into the wall 20, but preferably completely into the latter. In the instance illustrated, in each case only two connecting lines 7 and 8 are provided. It is also conceivable, however, according to the prevailing circumstances, to have a design with a plurality of connecting lines, these then separately forming fuel-routing circuits. This also applies similarly to the coolant-routing ducts.

The arrangement of the retaining device 5 on the case 6, in particular the fastening of said retaining device, is in this instance carried out in such a way that the case cover 21 provided for closing off the case in the axial direction is not included. It is also conceivable, however, for example, to design the case cover 21 as an integral part of the retaining device.

Functioning is similar to the known arrangements of transmissions 2 with heat exchangers 3. The direct coupling and integrated lines in the retaining device 5 provide a highly compact transmission/heat exchanger unit 1 which is free of hose lines and/or pipe lines routed next to this unit. The number of individual parts is minimized considerably, since here, in particular, there is only the retaining device with integrated ducts or lines. The connections on the retaining device, in particular on the end face 16, are in this instance arranged in such a way that they are complementary to the arrangement of the connections 11 and 12 on the case 6. To produce standardized heat exchangers 3, the connections 14 and 15 are arranged at a distance from one another transversely to the theoretical prolongation of the axis of rotation at the output A, this distance likewise being provided on the case 6. The heat exchanger itself may be designed in any desired way. Preferably, it is designed, for example, in the plate type of construction. Other versions may be envisaged.

The invention claimed is:

1. A transmission/heat exchanger unit, comprising:
   a transmission having
      a case,
      an input shaft couplable to an engine,
      at least one output on an output side of the transmission, and
      an output side end face of the transmission on the output side of the transmission;
   a heat exchanger on the output side of the transmission, connecting lines connecting the heat exchanger at least indirectly to the transmission;
   at least one oil-routing duct integrated in the case of the transmission, each oil-routing duct extending at least over part of the axial extent of the case to the output side end face of the transmission;
   a retaining device fastening the heat exchanger to the output-side end face of the case of the transmission;
   the connecting lines configured and operable to couple at least one oil-routing duct in the transmission case with the heat exchanger, the connecting lines being integrated in the retaining device; and
   complementary connections, standardized in type and dimension, on the retaining device and the transmission case for routing of oil and for fastening the retaining device.

2. The transmission/heat exchanger unit as claimed in claim 1, wherein the connecting lines are arranged at least partially in a wall of the retaining device.

3. The transmission/heat exchanger unit as claimed in claim 1, further comprising at least
   a first connection and a second connection provided for connecting coolant-routing lines to the heat exchanger.

4. The transmission/heat exchanger unit as claimed in claim 3, wherein the first and second connections for coolant are arranged on the retaining device and wherein one of the first and second connections is coupled to a coolant supply line, and the other of the first and second connections is coupled to a coolant discharge line.

5. The transmission/heat exchanger unit as claimed in claim 3, wherein at least one of the first and the second connections are arranged directly on the heat exchanger.

6. The transmission/heat exchanger unit as claimed in claim 1, wherein the heat exchanger is designed as a separate unit.

7. The transmission/heat exchanger unit as claimed in claim 1, wherein the oil-routing ducts are cast or worked in a wall of the case.

8. The transmission/heat exchanger unit as claimed in claim 7, wherein the oil-routing ducts are cast or worked in a reinforcement of the wall of the case.

9. The transmission/heat exchanger unit as claimed in claim 1, wherein the retaining device is fastened to the output-side end wall of the case in a region of an axial reinforcement of the end wall, wherein the connection is free of a fastening to a transmission cover closing the case on the output side.

10. The transmission/heat exchanger unit as claimed in claim 1, wherein connections of standardized design in terms of type and dimensioning are provided on the retaining device for coupling to complementary connections on the heat exchanger.

11. The transmission/heat exchanger unit as claimed in claim 1, further comprising a transmission cover, wherein the retaining device forms an integral unit with the transmission cover.

12. The transmission/heat exchanger unit as claimed in claim 11, wherein the retaining device extends through the case cover and has the connections for coupling to the connecting lines provided in the carrying element.

13. The transmission/heat exchanger unit as claimed in claim 1, wherein the oil-routing ducts are arranged in the case wall on both sides of a theoretical prolongation of the axis describing the output, wherein the supply lines are arranged on one side of the axis, and the discharge lines are arranged on the other side of the axis.

* * * * *